United States Patent
Ou et al.

(10) Patent No.: US 12,206,929 B2
(45) Date of Patent: Jan. 21, 2025

(54) VIDEO PLAYING METHOD AND APPARATUS

(71) Applicant: TENCENT TECHNOLOGY (SHENZHEN) COMPANY LIMITED, Shenzhen (CN)

(72) Inventors: Chunpeng Ou, Shenzhen (CN); Qun Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/675,098

(22) Filed: Feb. 18, 2022

(65) Prior Publication Data
US 2022/0174346 A1 Jun. 2, 2022

Related U.S. Application Data

(63) Continuation of application No. PCT/CN2020/126105, filed on Nov. 3, 2020.

(30) Foreign Application Priority Data

Feb. 14, 2020 (CN) .......................... 202010105302.0

(51) Int. Cl.
*H04N 21/431* (2011.01)
*A63F 13/60* (2014.01)
(Continued)

(52) U.S. Cl.
CPC ......... *H04N 21/4312* (2013.01); *A63F 13/60* (2014.09); *H04N 21/44008* (2013.01); *H04N 21/472* (2013.01); *A63F 2300/20* (2013.01)

(58) Field of Classification Search
CPC ........... H04N 21/4312; H04N 21/4331; H04N 21/4335; H04N 21/44008;
(Continued)

(56) References Cited

U.S. PATENT DOCUMENTS

| 10,555,023 B1 | 2/2020 | McCarthy et al. |
| 2013/0204919 A1* | 8/2013 | Kitazato ................. H04L 67/02 709/219 |

(Continued)

FOREIGN PATENT DOCUMENTS

| CN | 101127867 | 2/2008 |
| CN | 101282348 | 10/2008 |

(Continued)

OTHER PUBLICATIONS

English translation of International Search Report issued Feb. 5, 2021 in International Application No. PCT/CN2020/126105.

(Continued)

*Primary Examiner* — Rong Le
(74) *Attorney, Agent, or Firm* — Crowell & Moring LLP

(57) ABSTRACT

A video playing method and apparatus are provided. The method may include transmitting a scenario obtaining request. The scenario obtaining request may be for requesting to obtain scenario information of a first scenario video. The scenario information may include a video address of the first scenario video and n scenario development options. The method may further include playing the first scenario video according to the video address of the first scenario video, obtaining scenario video data corresponding to the n scenario development options during playing the first scenario video, and adding the scenario video data corresponding to the n scenario development options into a buffer list. The method may further include obtaining scenario video data of a second scenario video from the buffer list and playing the second scenario video in response to receiving a selection instruction for a target scenario development option in the n scenario development options.

20 Claims, 9 Drawing Sheets

(51) Int. Cl.
*H04N 21/44* (2011.01)
*H04N 21/472* (2011.01)

(58) Field of Classification Search
CPC ........... H04N 21/44016; H04N 21/472; H04N 21/4781; H04N 21/4825; H04N 21/8456; H04N 21/8541; H04N 21/8586
See application file for complete search history.

(56) References Cited

U.S. PATENT DOCUMENTS

| | | | |
|---|---|---|---|
| 2013/0259442 A1 | 10/2013 | Bloch et al. | |
| 2014/0082666 A1* | 3/2014 | Bloch | G06F 3/04842 725/37 |
| 2015/0312513 A1* | 10/2015 | Kummer | H04N 5/50 348/731 |
| 2016/0323608 A1* | 11/2016 | Bloch | H04N 21/26258 |

FOREIGN PATENT DOCUMENTS

| | | |
|---|---|---|
| CN | 109600635 | 4/2019 |
| CN | 110430461 | 11/2019 |
| CN | 111277869 | 6/2020 |
| EP | 2712206 A1 | 3/2014 |
| JP | 2019-051411 | 4/2019 |
| WO | WO2013/084544 | 6/2013 |

OTHER PUBLICATIONS

European Office Action issued on European application 20918595.8 on Nov. 25, 2022, 13 pages.

Japanese Office Action issued May 11, 2023 in corresponding Japan Patent Application No. 2022-524677 with English translation.

Heekwang Kim and Won Joo Park, Sun Joong Kim, and Kwangsue Chung, "Context-Aware Prefetching Scheme for Interactive Multimedia Services Based on HTTP Adaptive Streaming", 2016 2nd IEEE International Conference on Computer and Communications (ICCC), The U.S., IEEE, Oct. 14, 2016, and pp. 2123-2126.

European Office Action issued Sep. 11, 2023 in corresponding European Patent Application No. 20 918 595.8.

Japanese Notice of Reasons for Refusal issued May 11, 2023 in corresponding Japanese Patent Application No. 2022-524677 with English translation.

* cited by examiner

VIDEO PLAYING METHOD AND APPARATUS

RELATED APPLICATION

This application is a continuation application of PCT Patent Application No. PCT/CN2020/126105, filed on Nov. 3, 2020, which claims priority to Chinese Patent Application No. 202010105302.0, entitled "VIDEO PLAYING METHOD AND APPARATUS, DEVICE, AND STORAGE MEDIUM" filed on Feb. 14, 2020, wherein the content of each of the above-referenced applications is incorporated herein by reference in its entirety.

FIELD OF THE TECHNOLOGY

Embodiments of this application relate to the field of human-machine interaction, and in particular, to a video playing method and apparatus, a device, and a storage medium.

BACKGROUND OF THE DISCLOSURE

The interactive movie game is interactive combination of movie and television and game, and includes game products such as mobile games, web games, and client games improved based on movie and television works. The interactive movie game expands a game scenario in a form of video. The game scenario has a plurality of branches. Different options are displayed as the scenario develops. The player can make a reasonable selection, and the scenario may move to different branches with the selection of the player, so that different video content is played.

In the related art, before the player selects an option given in the game, the player cannot predict the video content that will be played next. Limited by the package body, a large amount of video data cannot be stored locally, and therefore, the video data is stored on a back-end server. Before a video is played, it is necessary to obtain a segment index file of the video from the server and obtain an address of a segment by parsing the segment index file of the video to obtain the segment.

In the above related art, because the video needs to be downloaded and decoded before playback, the video content cannot be switched quickly and seamlessly, which may cause a pause during video playback.

SUMMARY

Embodiments of this disclosure provide a video playing method and apparatus, a device, and a storage medium. When a terminal plays a video, it is unnecessary to download the video from a server and decode the video, thereby realizing smooth playback of the video. The technical solutions are as follows:

According to an aspect of this disclosure, a video playing method is provided. The method may be performed by a terminal. The method may include transmitting a scenario obtaining request. The scenario obtaining request may be for requesting to obtain scenario information of a first scenario video. The scenario information of the first scenario video may include a video address of the first scenario video and n scenario development options corresponding to the first scenario video, and n is a positive integer. The method may further include playing the first scenario video according to the video address of the first scenario video, obtaining scenario video data respectively corresponding to the n scenario development options during playing the first scenario video, and adding the scenario video data respectively corresponding to the n scenario development options into a buffer list. The method may further include obtaining scenario video data of a second scenario video from the buffer list and playing the second scenario video in response to receiving a selection instruction for a target scenario development option in the n scenario development options. The second scenario video is a scenario video corresponding to the target scenario development option.

According to another aspect of this disclosure, a video playing method is provided. The method may be performed by a terminal. The method may include playing a first scenario video in a user interface of a game application and displaying n scenario development options corresponding to the first scenario video in response to playing of the first scenario video being completed. The n is a positive integer. The method may further include playing a second scenario video in the user interface in response to receiving a selection instruction for a target scenario development option in the n scenario development options. The second scenario video may be a scenario video corresponding to the target scenario development option, and the second scenario video may be obtained according to video data of the second scenario video recorded in a buffer list.

According to another aspect of this disclosure, a video playing apparatus is provided. The apparatus may include a memory operable to store computer-readable instructions and a processor circuitry operable to read the computer-readable instructions. When executing the computer-readable instructions, the processor circuitry may be configured to transmit a scenario obtaining request. The scenario obtaining request may be for requesting to obtain scenario information of a first scenario video. The scenario information of the first scenario video may include a video address of the first scenario video and n scenario development options corresponding to the first scenario video. The n is a positive integer. The processor circuitry may be further configured to play the first scenario video according to the video address of the first scenario video, obtain scenario video data respectively corresponding to the n scenario development options during playing the first scenario video, and add the scenario video data respectively corresponding to the n scenario development options into a buffer list. The processor circuitry may be further configured to obtain scenario video data of a second scenario video from the buffer list and play the second scenario video in response to receiving a selection instruction for a target scenario development option in the n scenario development options. The second scenario video may be a scenario video corresponding to the target scenario development option.

According to another aspect of this disclosure, a computer device is provided. The computer device includes a processor and a memory, the memory storing at least one instruction, at least one program, a code set, or an instruction set, the at least one instruction, the at least one program, the code set, or the instruction set being loaded and executed by the processor to implement the video playing method described in the foregoing aspect.

According to another aspect of this disclosure, a computer-readable storage medium is provided. The computer-readable storage medium stores at least one instruction, at least one program, a code set or an instruction set. The at least one instruction, the at least one program, the code set or the instruction set are loaded and executed by a processor to implement the video playing method in the foregoing aspects.

According to another aspect of this disclosure, a computer program product is provided, the computer program product including computer instructions, the computer instructions being stored in a computer-readable storage medium. A processor of a computer device reads the computer instructions from the computer-readable storage medium, and executes the computer instructions, to cause the computer device to implement the video playing method in the foregoing aspects.

The technical solutions provided in the embodiments of this disclosure may include the following beneficial effects:

During playing a first scenario video, scenario video data of a scenario development option corresponding to the first scenario video is obtained, and the scenario video data is added into a buffer list. In this way, after a selection instruction for a target scenario development option is obtained, video data corresponding to a target scenario development option is directly obtained from the buffer list for playback. It is unnecessary to obtain a segment index file of the video from a server and obtain an address of a segment by parsing the segment index file of the video to play a video clip, thereby avoiding a pause during video playback resulted from too long loading time, and realizing smooth playback of the video.

DESCRIPTION OF EMBODIMENTS

First, terms involved in the embodiments of this disclosure are briefly introduced as follows:

1. An interactive movie game can be also referred to as an interactive movie and television game, and is interactive combination of movie and television and game. The interactive movie game includes game products such as mobile games, web games, and client games improved based on movie and television works. In a game, a scenario has a plurality of branches. Different options are displayed as the scenario develops. The player can make a reasonable selection, and the scenario may move to different branches with the selection of the player, so that different video content is played.

2. HTTP live streaming (HLS) is an HTTP-based streaming media network transmission protocol proposed by Apple Inc., and is mainly used for audio and video services on terminals. The HLS is formed by M3U8 segment index files and Transport stream (TS) segments. The HLS protocol has such advantages: easy to deploy, easy to distribute, low performance requirements for a server, and supporting for adaptive bitrate playback.

A working principle of the HLS is to divide an entire audio and video stream into small HTTP-based files for downloading, and only part of the files is downloaded each time. When a media stream is playing, a client can select to download the same resource at different rates from many different alternate sources, and allow a streaming media session to adapt to different data rates.

3. An M3U8 file is an index file of a TS segment, and is used for storing download addresses of TS segments in a server. A terminal can read the TS segments in turn according to the M3U8 file.

4. A TS segment is a video clip obtained by dividing an entire video file or a video stream.

5. Read_thread is a video reading thread, used for reading video data.

6. AVFormatContext describes composition and basic information of a media file or media stream, which is created by a read_thread, and mainly used for assigning function pointers and determining a function of opening a file and a function of closing the file by default.

Figure 1:
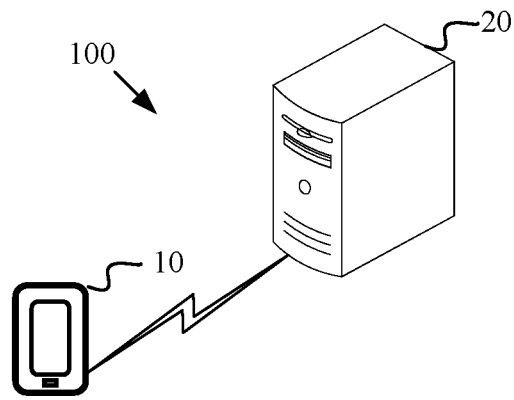
FIG. 1 is a schematic structural diagram of a computer system according to an exemplary embodiment of this disclosure.

FIG. 1 is a schematic structural diagram of a computer system 100 according to an embodiment of this disclosure. The computer system 100 includes a terminal 10 and a server 20.

The terminal 10 in this disclosure may be a mobile phone, a personal computer (PC), a tablet computer, an e-book reader, a moving picture experts group audio layer III (MP3) player, a moving picture experts group audio layer IV (MP4) player, or the like. This is not limited in this embodiment of this disclosure.

A client of a target application is mounted and run on the terminal 10, the target application may be a game application, and the game may be an interactive narration type game, an interactive scenario type game, an interactive video type game (for example, an interactive movie), an interactive music type game or another game having scenarios. For example, a large game story frame is set in a game, and a plurality of game scenario branches are set in the game story frame. The game scenario branches are connected together according to a specific scenario logic, thereby forming a corresponding game story. A player performs an interactive operation in the game, the terminal develops a corresponding game scenario based on the interactive operation of the player, for example, different options are displayed as the scenario develops. The player can make a reasonable selection, and the scenario may move to different branches with the selection of the player, so that the entire game story goes to different endings.

The server 20 may communicate with the terminal 10 through a wired or wireless network. The server 20 may be a back-end server of the target application, used for providing a back-end service for the target application.

The server 20 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. This is not limited in this embodiment of this disclosure.

The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

The cloud computing refers to the delivery and use mode of Internet Technology (IT) infrastructure, which refers to obtaining a required resource through the network in an on-demand and easily scalable manner. Generalized cloud computing refers to the delivery and use mode of service, which refers to obtaining a required service through the network in an on-demand and easily scalable manner. The service may be related to IT, software, and Internet, or may be another service. The cloud computing is a product of development and integration of traditional computer and network technologies, for example, grid computing, distributed computing, parallel computing, utility computing, network storage technologies, virtualization, and load balancing.

The technical solution of this disclosure is described below by using several embodiments.

Figure 2:
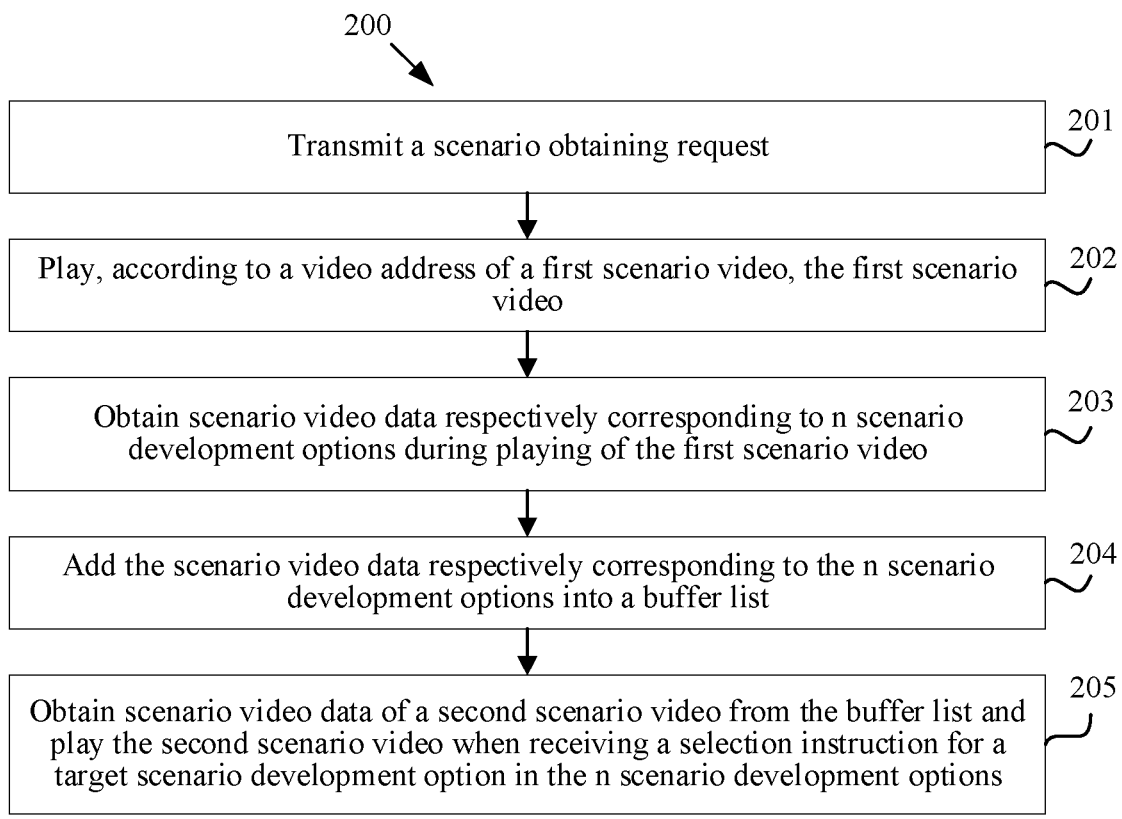
FIG. 2 is a flowchart of a video playing method according to an exemplary embodiment of this disclosure.

FIG. 2 is a flowchart of a video playing method 200 according to an embodiment of this disclosure. In this embodiment, description may be mainly made by using an example in which the method 200 is applied to the client of the target application mounted and run on the terminal 10 shown in FIG. 1. The method 200 may include the following steps:

Step 201: Transmit a scenario obtaining request.

After a user operates the client of the target application mounted on the terminal, the client transmits the scenario obtaining request to a server. The scenario obtaining request is used for requesting to obtain scenario information of a first scenario video, where the first scenario video is a scenario video that is being played in the client.

The target application has been introduced as in the other embodiments described herein.

Correspondingly, the server records a playback node of the scenario video played by the client. Therefore, after the scenario obtaining request transmitted by the client is received, the server may directly query the playback node of the played scenario video, determine the first scenario video, and obtain the scenario information of the first scenario video to transmit the scenario information to the client.

The scenario information of the first scenario video includes information related to the first scenario video. The scenario information of the first scenario video includes a video address of the first scenario video and n scenario development options corresponding to the first scenario video, where n is a positive integer.

The video address includes a uniform resource locator (URL), and the URL is a concise representation of a location and access method of a resource obtained on the Internet, and is an address of a standard resource on the Internet. Video data may be obtained through the video address.

The n scenario development options are used for being selected by the player, each scenario development option corresponds to a different scenario branch. The player may make a reasonable selection, and the scenario may move to different branches with the selection of the player, so that an entire scenario goes to different endings.

The scenario development options may be text options, speech options, or image options. This is not limited in this embodiment of this disclosure.

Step 202: Play the first scenario video according to the video address of the first scenario video.

After the scenario information of the first scenario video transmitted by the server is obtained, the client plays the first scenario video according to the video address of the first scenario video in the scenario information.

After the video address of the first scenario video is obtained, the client obtains video data of the first scenario video according to the video address of the first scenario video, and plays the first scenario video according to the video data of the first scenario video.

Step 203: Obtain scenario video data respectively corresponding to the n scenario development options during playing of the first scenario video.

During playing of the first scenario video, the client obtains the scenario video data respectively corresponding to the n scenario development options.

The scenario video data may be video data obtained by performing decapsulation on data obtained according to the video address. The scenario video data may be represented as AVPacket.

Step 204: Add the scenario video data respectively corresponding to the n scenario development options into a buffer list.

The client may add the scenario video data respectively corresponding to the n scenario development options into the buffer list.

The buffer list is used for buffering the scenario video data, that is, the buffer list is essentially a video data list.

Step 205: Obtain scenario video data of a second scenario video from the buffer list and play the second scenario video when a selection instruction for a target scenario development option in the n scenario development options is received.

The player may autonomously select the target scenario development option from the n scenario development options. Correspondingly, the client may obtain the selection instruction for the target scenario development option, and the selection instruction for the target scenario development option is used for indicating a scenario video corresponding to the target scenario development option.

The target scenario development option may be any scenario development option in the n scenario development options.

After the selection instruction for the target scenario development option is received, the client may directly obtain scenario video data of a second scenario video from the buffer list and play the second scenario video, and the second scenario video is the scenario video corresponding to the target scenario development option.

In conclusion, according to the technical solutions provided in this embodiment of this disclosure, during playing a first scenario video, scenario video data of a scenario development option corresponding to the first scenario video is obtained, and the scenario video data is added into a buffer list. In this way, after a selection instruction for a target scenario development option is obtained, video data corresponding to a target scenario development option is directly obtained from the buffer list for playback. It is unnecessary to obtain a segment index file of the video from a server and obtain an address of a segment by parsing the segment index file of the video to play a video clip, thereby avoiding a pause during video playback resulted from too long loading time, and realizing smooth playback of the video.

Figure 3:
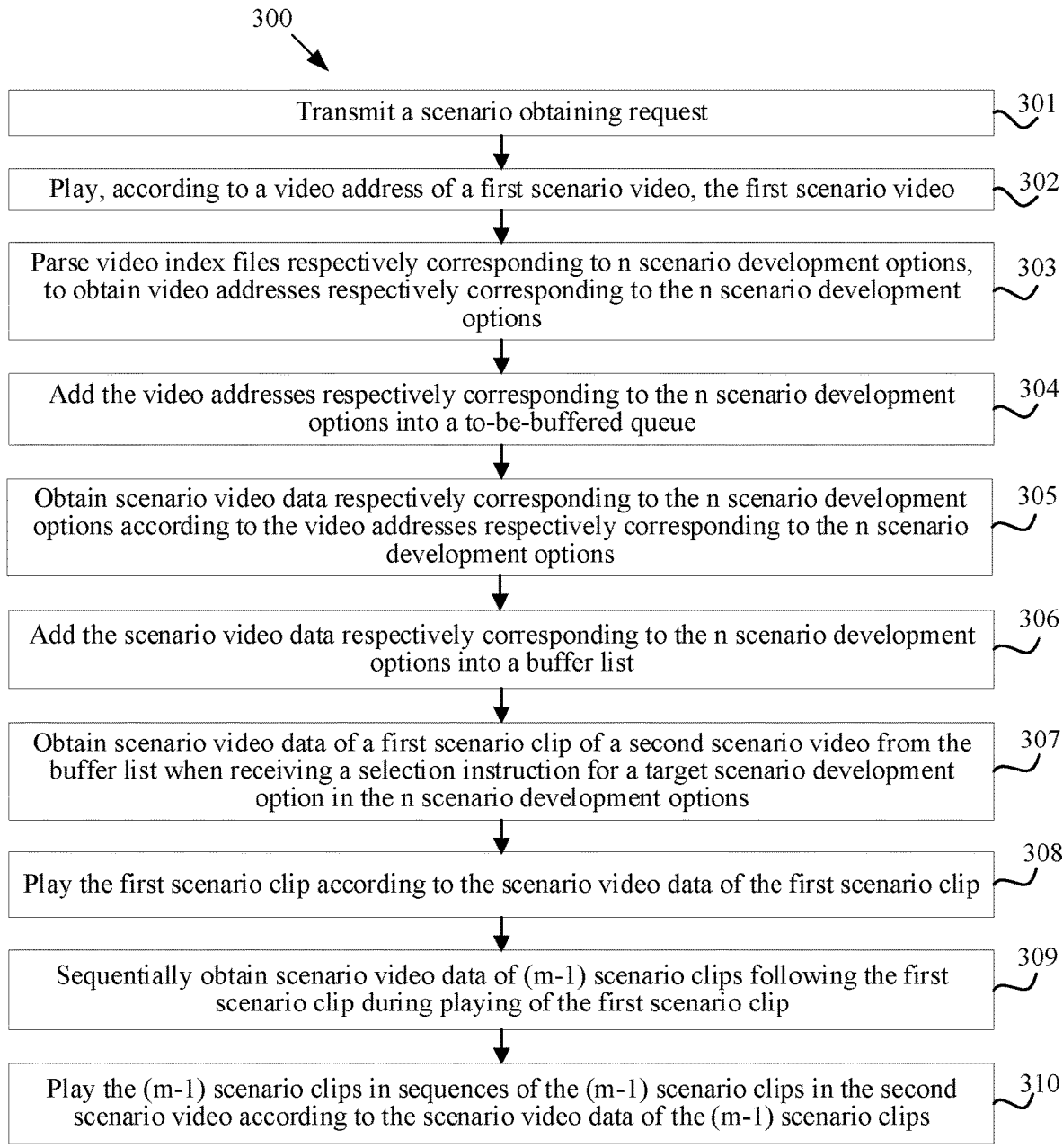
FIG. 3 is a flowchart of a video playing method according to another exemplary embodiment of this disclosure.

FIG. 3 is a flowchart of a video playing method 300 according to another embodiment of this disclosure. In this embodiment, description may be mainly made by using an example in which the method 300 is applied to the client of the target application mounted and run on the terminal 10 shown in FIG. 1. The method 300 may include the following steps:

Step 301: Transmit a scenario obtaining request.

The scenario obtaining request is used for requesting to obtain scenario information of a first scenario video. The scenario information of the first scenario video includes a video address of the first scenario video and n scenario development options corresponding to the first scenario video, where n is a positive integer.

This step is the same as or similar to content of step 201 in the embodiment of FIG. 2, and details refer to step 201 in the embodiment of FIG. 2 described herein.

The scenario information of the first scenario video further includes video index files corresponding to the n scenario development options. The video index files may be an M3U8 file. The M3U8 file has been introduced as in the other embodiments described herein.

Step 302: Play the first scenario video according to the video address of the first scenario video.

This step is the same as or similar to content of step 202 in the embodiment of FIG. 2, and details refer to step 202 in the embodiment of FIG. 2 described herein.

The playing the first scenario video according to the video address of the first scenario video includes: invoking a second sub-thread of a video reading thread to play the first scenario video according to the video address of the first scenario video.

The video reading thread is used for reading video data. In this embodiment of this disclosure, the video reading thread may construct two AVFormatContexts, which are referred to as a first sub-thread and a second sub-thread, where the first sub-thread is used for buffering video data, and the second sub-thread is used for decoding and playing a video. The AVFormatContext has been introduced as in the other embodiments described herein.

In this embodiment of this disclosure, through the two sub-threads, one is used for decoding and playing, and the other is used for buffering the video data, thereby avoiding a pause during video playback.

Step 303: Parse the video index files respectively corresponding to the n scenario development options, to obtain video addresses respectively corresponding to the n scenario development options.

When the scenario information of the first scenario video includes the video index files corresponding to the n scenario development options, after the video index files are obtained, the client may parse the video index files respectively corresponding to the n scenario development options, to obtain the video addresses respectively corresponding to the n scenario development options.

Step 304: Add the video addresses respectively corresponding to the n scenario development options into a to-be-buffered queue.

After the video addresses respectively corresponding to the n scenario development options are obtained, the video addresses are added into the to-be-buffered queue.

The to-be-buffered queue is used for recording video addresses of to-be-buffered scenario videos, that is, the to-be-buffered queue is essentially a video address queue.

Step 305: Obtain scenario video data respectively corresponding to the n scenario development options according to the video addresses respectively corresponding to the n scenario development options.

After the video addresses respectively corresponding to the n scenario development options are obtained, the scenario video data respectively corresponding to the n scenario development options is obtained according to the video addresses respectively corresponding to the n scenario development options. The video data has been introduced as in the other embodiments described herein.

The obtaining scenario video data respectively corresponding to the n scenario development options according to the video addresses respectively corresponding to the n scenario development options includes:

When the video addresses of the to-be-buffered scenario videos exist in the to-be-buffered queue, invoking a first sub-thread of the video reading thread to obtain the scenario video data respectively corresponding to the n scenario development options according to the video addresses respectively corresponding to the n scenario development options.

When video addresses of scenario videos that need to be buffered exist in the to-be-buffered queue, the client invokes the first sub-thread of the video reading thread to obtain the scenario video data.

The video reading thread may construct ExtraPacketInfo data structures corresponding to the video addresses of scenario videos that need to be buffered, and store the scenario video data through the ExtraPacketInfo data structures.

The client invokes a buffer thread to query whether the video addresses of the to-be-buffered scenario videos exist in the to-be-buffered queue.

The buffer thread queries the to-be-buffered queue in a polling manner. In some other embodiments, the query may alternatively be performed in a manner of hash index. This is not limited in this embodiment of this disclosure.

In addition, when the client queries that the video addresses of the to-be-buffered scenario videos do not exist in the to-be-buffered queue, the client may further perform the following steps:

(1) When scenario video data of a second scenario video does not exist in a buffer list, invoke the second sub-thread of the video reading thread to obtain a video index file corresponding to the second scenario video.

(2) Obtain the scenario video data of the second scenario video according to the video index file corresponding to the second scenario video.

Due to poor network quality and other reasons, the scenario video data of the second scenario video cannot be added into the buffer list. In this case, the client may invoke the second sub-thread of the video reading thread, to obtain the video index file corresponding to the second scenario video from a server, and obtain the scenario video data of the second scenario video according to the video index file corresponding to the second scenario video.

When the second scenario video includes m scenario clips, the client may invoke the second sub-thread of the video reading thread, to sequentially obtain video index files corresponding to scenario clips from a first scenario clip as a start, so as to obtain scenario video data of the scenario clips.

Step 306: Add the scenario video data respectively corresponding to the n scenario development options into the buffer list.

This step is the same as or similar to content of step 204 in the embodiment of FIG. 2, and details refer to the step 204 in the embodiment of FIG. 2 described herein.

Step 307: Obtain scenario video data of the first scenario clip of the second scenario video from the buffer list when a selection instruction for a target scenario development option in the n scenario development options is received.

The second scenario video includes the m scenario clips, and m is a positive integer.

When the second scenario video includes a plurality of scenario clips, the client obtains the scenario video data of the first scenario clip of the second scenario video from the buffer list after the selection instruction for the target scenario development option in the n scenario development options is obtained. The first scenario clip is the first scenario clip of the second scenario video.

The scenario video data corresponding to other scenario development options than the target scenario development option is deleted from the buffer list when the selection instruction for the target scenario development option is obtained.

After the selection instruction corresponding to the target scenario development option is obtained, the client may further delete the scenario video data corresponding to other scenario development options than the target scenario development option from the buffer list, so as to optimize an entire buffer queue, and reduce a length of the buffer queue.

Step 308: Play the first scenario clip according to the scenario video data of the first scenario clip.

After the scenario video data of the first scenario clip is obtained, the scenario video data of the first scenario clip may be pushed to the second sub-thread for decoding, and the first scenario clip is played after the decoding is completed.

Step 309: Sequentially obtaining scenario video data of (m−1) scenario clips following the first scenario clip during playing of the first scenario clip.

During playing of the first scenario clip, the client may sequentially obtain the scenario video data of the (m−1) scenario clips following the first scenario clip by using the time of playing the buffered first scenario clip, so that the client may directly play the (m−1) scenario clips based on the obtained scenario video data of the (m−1) scenario clips after the playing of the first scenario clip is completed, thereby realizing smooth playback of the video.

The client may invoke the second sub-thread of the video reading thread, to obtain video index files corresponding to the (m−1) scenario clips from the server, and obtain the scenario video data of the (m−1) scenario clips based on the video index files corresponding to the (m−1) scenario clips.

Step 310: Play the (m−1) scenario clips in sequences of the (m−1) scenario clips in the second scenario video according to the scenario video data of the (m−1) scenario clips.

After the scenario video data of the (m−1) scenario clips is obtained, the client may further obtain the (m−1) scenario clips based on the scenario video data of the (m−1) scenario clips, and play the (m−1) scenario clips in the sequences of the (m−1) scenario clips in the second scenario video.

Each scenario clip has a playing timestamp, and a playback sequence of the scenario clip in the second scenario video may be clarified through the playing timestamp.

In conclusion, according to the technical solutions provided in this embodiment of this disclosure, during playing a first scenario video, scenario video data of a scenario development option corresponding to the first scenario video is obtained, and the scenario video data is added into a buffer list. In this way, after a selection instruction for a target scenario development option is obtained, video data corresponding to a target scenario development option is directly obtained from the buffer list for playback. It is unnecessary to obtain a segment index file of the video from a server and obtain an address of a segment by parsing the segment index file of the video to play a video clip, thereby avoiding a pause during video playback resulted from too long loading time, and realizing smooth playback of the video.

In addition, the video reading thread includes two sub-threads, one is used for decoding and playing, and the other is used for buffering the video data, thereby avoiding a pause during video playback.

In addition, the scenario video data corresponding to other scenario development options than the target scenario development option is deleted from the buffer list, which can optimize an entire buffer queue, and reduce a length of the buffer queue.

Figure 4:
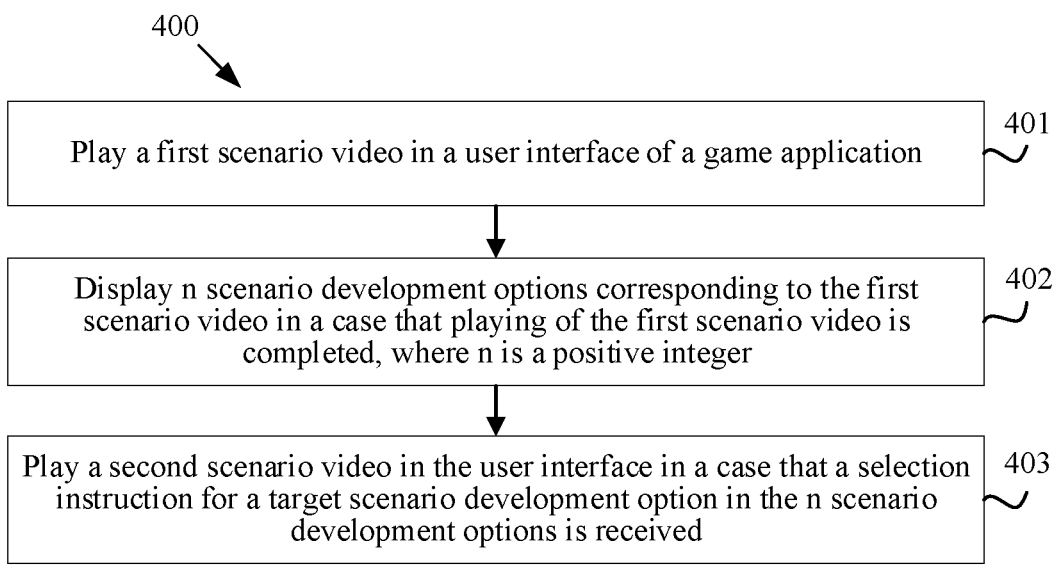
FIG. 4 is a flowchart of a video playing method according to another exemplary embodiment of this disclosure.

FIG. 4 is a flowchart of a video playing method 400 according to still another embodiment of this disclosure. In this embodiment, description may be mainly made by using an example in which the method 400 is applied to the client of the target application (for example, a game application) mounted and run on the terminal 10 shown in FIG. 1. The method 400 may include the following steps:

Step 401: Play a first scenario video in a user interface of the game application.

The user operates the client of the target application mounted on the terminal, the client displays the user interface, and the first scenario video is played in the user interface.

The user interface plays a scenario video, and the first scenario video is the scenario video that is being played in the client.

The user interface includes video duration information, and the video duration information includes a total video duration and a played video duration, where the total video duration refers to a total duration of the first scenario video, and the played video duration refers to a played duration.

The user interface further includes a definition adjustment control, a playback speed adjustment control, a screenshot control, and the like, where the definition adjustment control is used for adjusting a definition of the video; the playback speed adjustment control is used for adjusting a playback speed of the video; and the screenshot control is used for the user to take an image screenshot of the video that is being played. In some embodiments, the user interface further includes a setting control and other controls. This is not limited in this embodiment of this disclosure.

Figure 5:
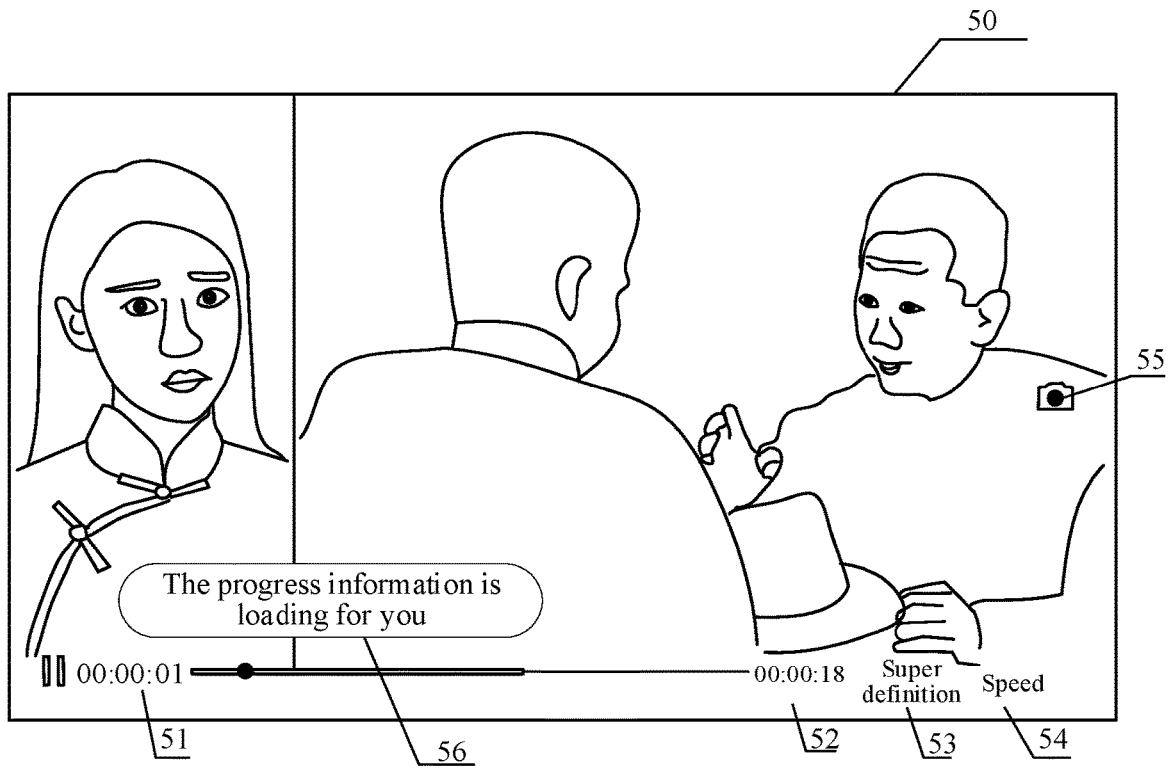
FIG. 5 is a schematic diagram of a user interface according to an exemplary embodiment of this disclosure.

Exemplarily, as shown in FIG. 5, a first scenario video is being played in a user interface 50. The user interface displays video duration information, for example, a total video duration 51 and a played video duration 52. The user interface further displays a definition adjustment control 53, a playback speed adjustment control 54, a screenshot control 55, and the like.

Step 402: Display n scenario development options corresponding to the first scenario video when playing of the first scenario video is completed, where n is a positive integer.

After the playing of the first scenario video is completed, the n scenario development options corresponding to the first scenario video may be displayed.

The n scenario development options are used for being selected by the player, each scenario development option corresponds to a different scenario development branch. The player may make a reasonable selection, and the scenario may move to different branches with the selection of the player, so that an entire game story goes to different endings.

The scenario development options may be text options, speech options, or image options. This is not limited in this embodiment of this disclosure.

Figure 6:
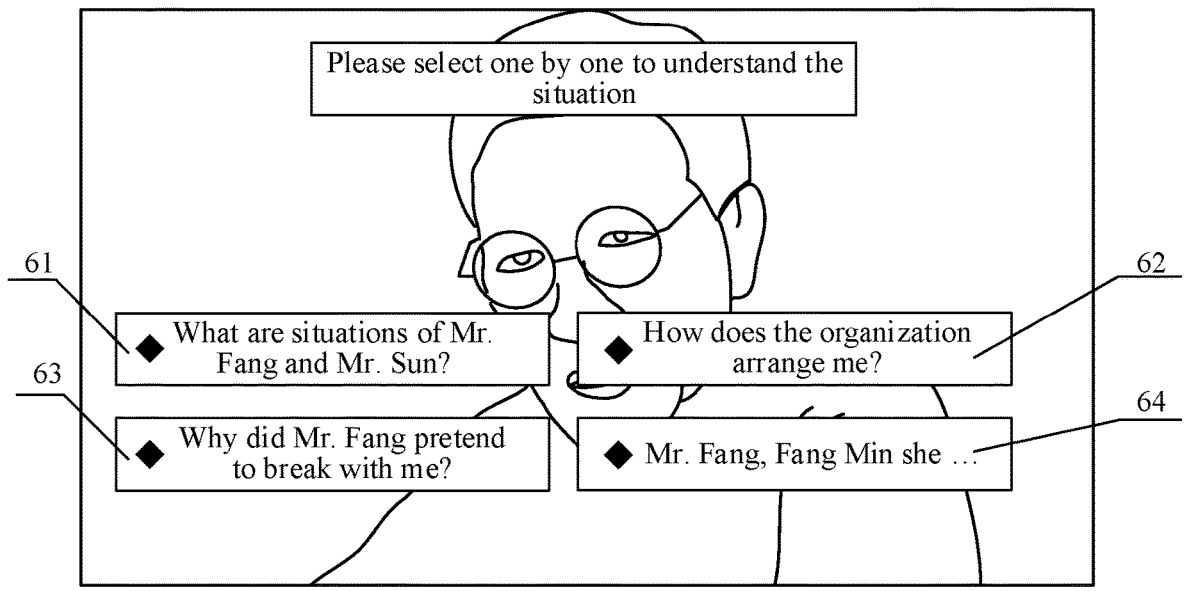
FIG. 6 is a schematic diagram of a scenario development option according to an exemplary embodiment of this disclosure.

Exemplarily, as shown in FIG. 6, by using an example in which the scenario development options are the text options, after the playing of the first scenario video is completed, four scenario development options may be displayed, for example, a first scenario development option 61: "What are situations of Mr. Fang and Mr. Sun?"; a second scenario development option 62: "How does the organization arrange me?"; a third scenario development option 63: "Why did Mr. Fang pretend to break with me?"; and a fourth scenario development option 64: "Mr. Fang, Fang Min she . . . ?".

Step 403: Play a second scenario video in the user interface when a selection instruction for a target scenario development option in the n scenario development options is received.

The player may autonomously make a selection from the n scenario development options. Correspondingly, after the selection instruction for the target scenario development option in the n scenario development options is received, the client plays the second scenario video in the user interface. The second scenario video is a scenario video corresponding to the target scenario development option.

The second scenario video is obtained according to video data of the second scenario video recorded in a buffer list.

Figure 7:
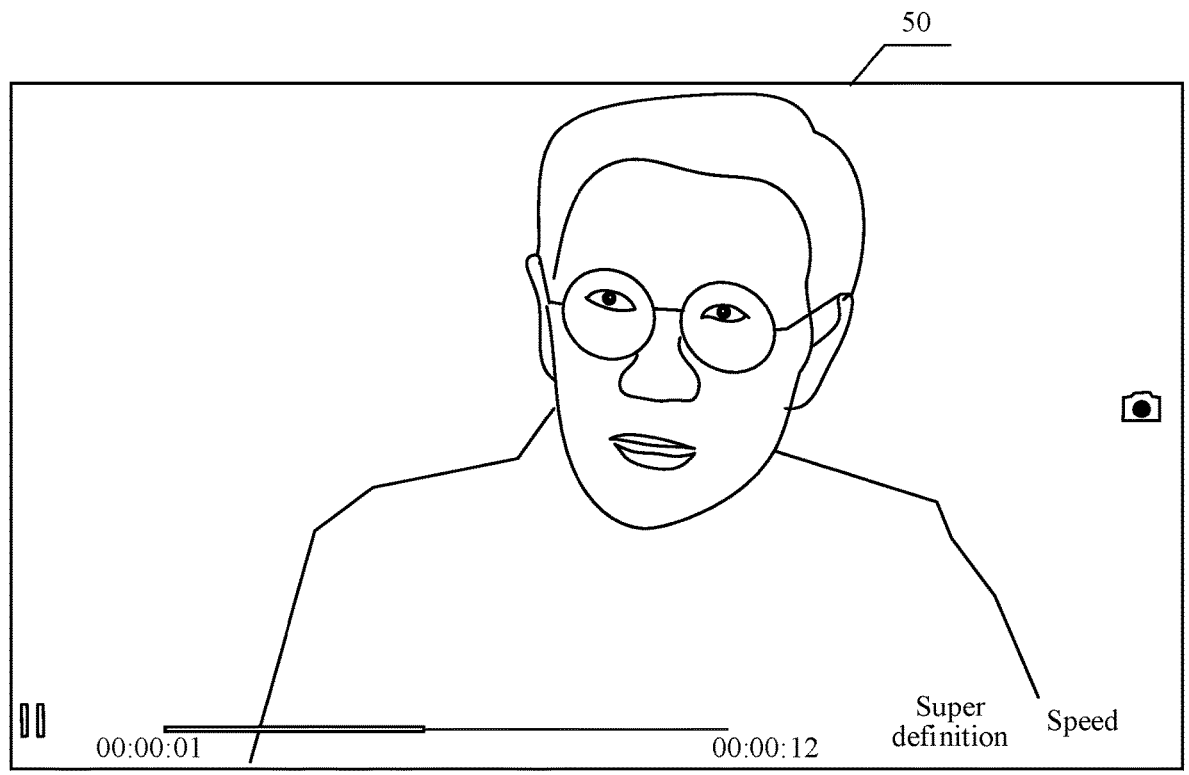
FIG. 7 is a schematic diagram of a user interface according to another exemplary embodiment of this disclosure.

Exemplarily, as shown in FIG. 7, after the target scenario development option in the n scenario development options is selected, the user may play the scenario video corresponding to the target scenario development option in the user interface 50.

Loading progress information is displayed during playing of the first scenario video; and the display of the loading progress information is canceled when loading of the second scenario video is completed.

The loading progress information is used for indicating a loading progress of the second scenario video.

Exemplarily, as shown in FIG. 5, loading progress information 56 may be displayed during playing of the first scenario video, for example, "The progress information is loading for you", and the loading progress information 56 automatically disappears after loading of the scenario video is completed.

In conclusion, according to the technical solutions provided in this embodiment of this disclosure, during playing a first scenario video, a second scenario video is directly obtained according to video data of the second scenario video recorded in a buffer list, so that the second scenario video is directly played after the playing of the first scenario video is completed. In this way, it is unnecessary to download the second scenario video from a server and decode the second scenario video, thereby avoiding a pause during video playback resulted from too long loading time, and realizing smooth playback of the video.

In addition, loading progress information is displayed, so that the player can accurately learn a current loading process.

Figure 8:
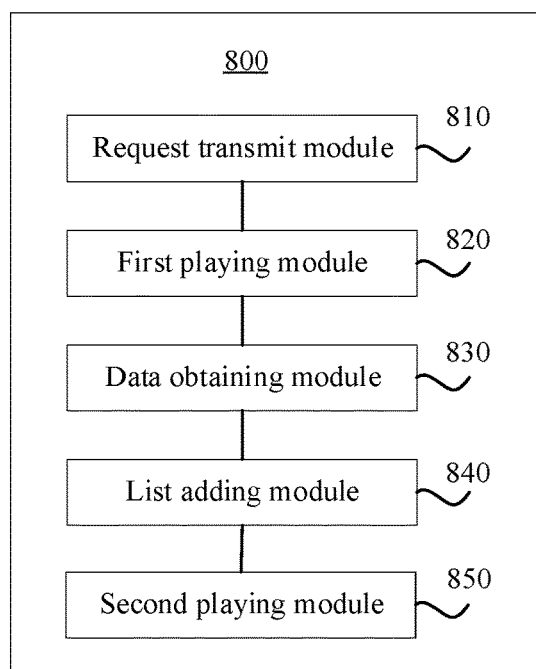
FIG. 8 is a block diagram of a video playing apparatus according to an exemplary embodiment of this disclosure.

FIG. 8 is a block diagram of a video playing apparatus according to an embodiment of this disclosure. The apparatus has a function of realizing the above video playing method example, and the function may be realized by hardware or by hardware executing corresponding software. The apparatus may be the terminal described above, or may be disposed on the terminal. An apparatus 800 may include: a request transmit module 810, a first playing module 820, a data obtaining module 830, a list adding module 840, and a second playing module 850.

Herein, the term module (and other similar terms such as unit, submodule, etc.) may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module. A module is configured to perform functions and achieve goals such as those described in this disclosure, and may work together with other related modules, programs, and components to achieve those functions and goals.

The request transmit module 810 is configured to transmit a scenario obtaining request, where the scenario obtaining request is used for requesting to obtain scenario information of a first scenario video, the scenario information of the first scenario video includes a video address of the first scenario video and n scenario development options corresponding to the first scenario video, and n is a positive integer.

The first playing module 820 is configured to play the first scenario video according to the video address of the first scenario video.

The data obtaining module 830 is configured to obtain scenario video data respectively corresponding to the n scenario development options during playing of the first scenario video.

The list adding module 840 is configured to add the scenario video data respectively corresponding to the n scenario development options into a buffer list.

The second playing module 850 is configured to obtain scenario video data of a second scenario video from the buffer list and play the second scenario video when a selection instruction for a target scenario development option in the n scenario development options is received, where the second scenario video is a scenario video corresponding to the target scenario development option.

In conclusion, according to the technical solutions provided in this embodiment of this disclosure, during playing a first scenario video, scenario video data of a scenario development option corresponding to the first scenario video is obtained, and the scenario video data is added into a buffer list. In this way, after a selection instruction for a target scenario development option is obtained, video data corresponding to a target scenario development option is directly obtained from the buffer list for playback. It is unnecessary to obtain a segment index file of the video from a server, and obtain an address of a segment by parsing the segment index file of the video to play a video clip, thereby avoiding a pause during video playback resulted from too long loading time, and realizing smooth playback of the video.

Figure 9:
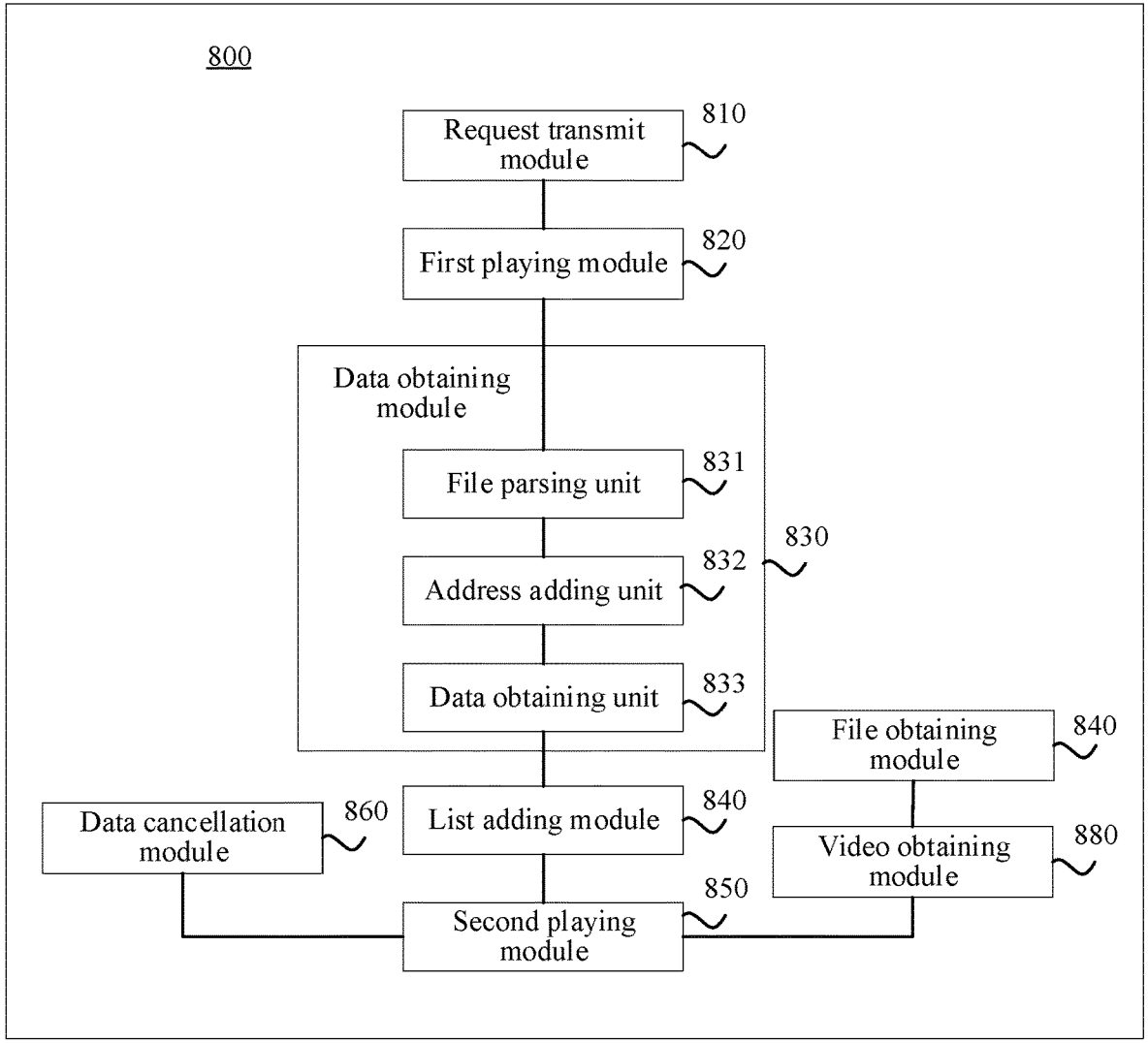
FIG. 9 is a block diagram of a video playing apparatus according to another exemplary embodiment of this disclosure.

In some implementations, the scenario information of the first scenario video further includes a video index file corresponding to at least one scenario development option. As shown in FIG. 9, the data obtaining module 830 includes: a file parsing unit 831, an address adding unit 832, and a data obtaining unit 833.

The file parsing unit 831 is configured to parse video index files respectively corresponding to the n scenario development options, to obtain video addresses respectively corresponding to the n scenario development options.

The address adding unit 832 is configured to add the video addresses respectively corresponding to the n scenario development options into a to-be-buffered queue, where the to-be-buffered queue is used for recording video addresses of to-be-buffered scenario videos.

The data obtaining unit 833 is configured to obtain scenario video data respectively corresponding to the n scenario development options according to the video addresses respectively corresponding to the n scenario development options.

In some implementations, the data obtaining unit 833 is configured to: invoke, when the video addresses of the to-be-buffered scenario videos exist in the to-be-buffered queue, a first sub-thread of a video reading thread to obtain the scenario video data respectively corresponding to the n scenario development options according to the video addresses respectively corresponding to the n scenario development options.

In some implementations, the second scenario video includes m scenario clips, and m is a positive integer; and the second playing module 850 is configured to obtain scenario video data of a first scenario clip of the second scenario video from a buffer list; play the first scenario clip according to the scenario video data of the first scenario clip; sequentially obtain scenario video data of (m−1) scenario clips following the first scenario clip during playing of the first scenario clip; and play the (m−1) scenario clips in sequences of the (m−1) scenario clips in the second scenario video according to the scenario video data of the (m−1) scenario clips.

In some implementations, the apparatus 800 further includes: a data deletion module 860.

The data deletion module 860 is configured to delete, when a selection instruction for a target scenario development option is obtained, the scenario video data corresponding to other scenario development options than the target scenario development option in the buffer list.

In some implementations, the apparatus 800 further includes: a file obtaining module 870 and a video obtaining module 880.

The file obtaining module 870 is configured to invoke a second sub-thread of the video reading thread to obtain a video index file corresponding to the second scenario video when scenario video data of the second scenario video does not exist in the buffer list.

The data deletion module 880 is configured to obtain the scenario video data of the second scenario video according to the video index file corresponding to the second scenario video.

In some implementations, the first playing module 820 is configured to invoke the second sub-thread of the video reading thread to play the first scenario video according to the video address of the first scenario video.

Figure 10:
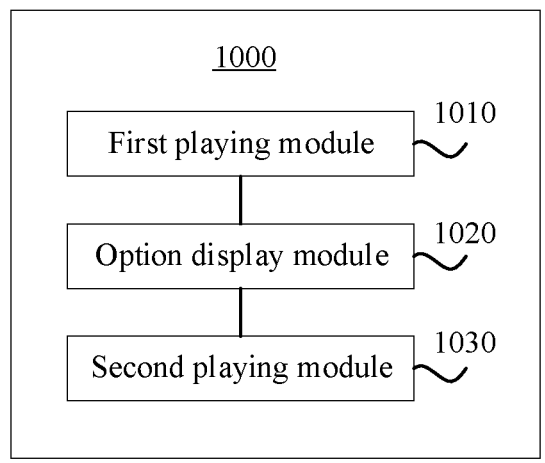
FIG. 10 is a block diagram of a video playing apparatus according to another exemplary embodiment of this disclosure.

FIG. 10 is a block diagram of a video playing apparatus according to another embodiment of this disclosure. The apparatus has a function of realizing the above video playing method example, and the function may be realized by hardware or by hardware executing corresponding software. The apparatus may be the terminal described above, or may be disposed on the terminal. An apparatus 1000 may include: a first playing module 1010, an option display module 1020, and a second playing module 1030.

The first playing module 1010 is configured to play a first scenario video in a user interface of a game application.

The option display module 1020 is configured to display n scenario development options corresponding to the first scenario video when playing of the first scenario video is completed, where n is a positive integer.

The second playing module 1030 is configured to play a second scenario video in the user interface when a selection instruction for a target scenario development option in the n scenario development options is received, where the second scenario video is a scenario video corresponding to the target scenario development option, and the second scenario video is obtained according to video data of the second scenario video recorded in a buffer list.

In conclusion, according to the technical solutions provided in this embodiment of this disclosure, during playing a first scenario video, a second scenario video is directly obtained according to video data of the second scenario video recorded in a buffer list, so that the second scenario video is directly played after the playing of the first scenario video is completed. In this way, it is unnecessary to download the second scenario video from a server and decode the second scenario video, thereby avoiding a pause during video playback resulted from too long loading time, and realizing smooth playback of the video.

Figure 11:
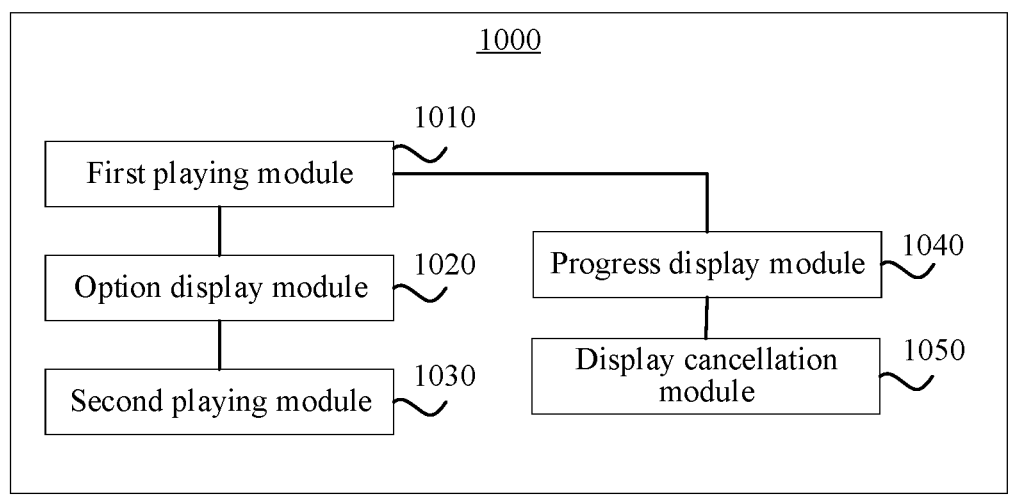
FIG. 11 is a block diagram of a video playing apparatus according to another exemplary embodiment of this disclosure.

In some implementations, as shown in FIG. 11, the apparatus 1000 further includes: a progress display module 1040 and a display cancellation module 1050.

The progress display module 1040 is configured to display loading progress information during playing of the first scenario video, where the loading progress information is used for indicating a loading progress of the second scenario video.

The display cancellation module 1050 is configured to cancel the display of the loading progress information when loading of the second scenario video is completed.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments described herein.

Figure 12:
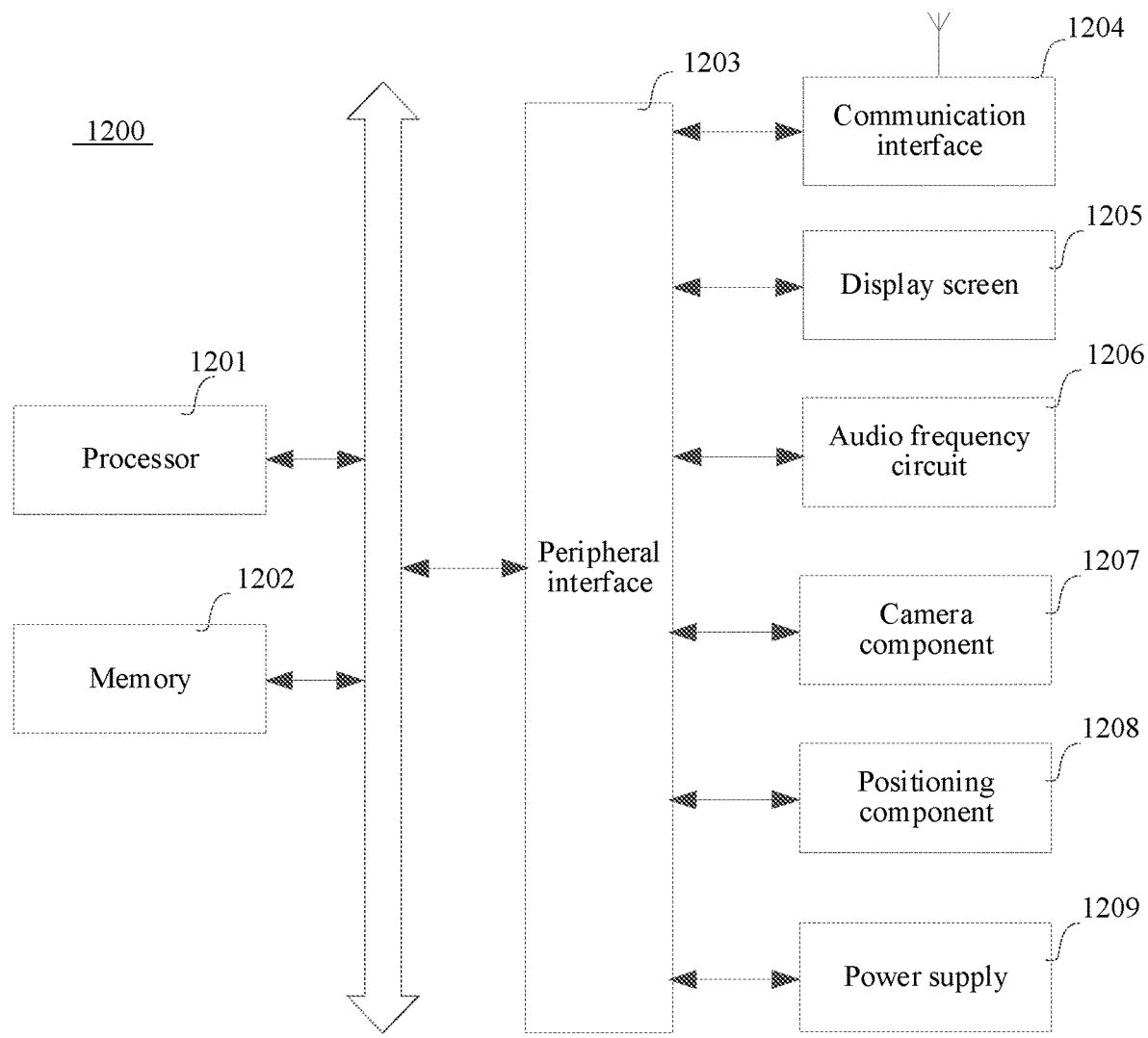
FIG. 12 is a structural block diagram of a terminal according to an exemplary embodiment of this disclosure.

FIG. 12 is a structural block diagram of a terminal according to an embodiment of this disclosure. Generally, a terminal 1200 includes a processor 1201 and a memory 1202.

The processor 1201 may include one or more processing cores. For example, the processor 1201 may be a 4-core processor or an 8-core processor. The processor 1201 may be implemented by using at least one hardware form of a digital signal processor (DSP), a field programmable gate array (FPGA), and a programmable logic array (PLA). The processor 1201 may alternatively include a main processor and a coprocessor. The main processor is configured to process data in an active state, also referred to as a central processing unit (CPU). The coprocessor is a low-power processor configured to process data in a standby state. In some embodiments, the processor 1201 may be integrated with a graphics processing unit (GPU). The GPU is configured to render and draw content that needs to be displayed on a display. In some embodiments, the processor 1201 may further include an artificial intelligence (AI) processor. The AI processor is configured to process computing operations related to machine learning.

The memory 1202 may include one or more computer-readable storage media. The computer-readable storage media may be non-transient. The memory 1202 may further include a high-speed random access memory and a nonvolatile memory, for example, one or more disk storage devices or flash storage devices. In some embodiments, a non-transitory computer-readable storage medium in the memory 1202 is configured to store at least one instruction, at least one program, a code set or an instruction set, the at least one instruction, the at least one program, the code set or the instruction set being configured to be executed by the processor 1201 to implement the video playing method provided in the method embodiments of this disclosure.

In some embodiments, the terminal 1200 may include a peripheral interface 1203 and at least one peripheral. The processor 1201, the memory 1202, and the peripheral interface 1203 may be connected by using a bus or a signal cable. Each peripheral may be connected to the peripheral interface 1203 by using a bus, a signal cable, or a circuit board. Specifically, the peripheral may include: at least one of a communication interface 1204, a display screen 1205, an audio circuit 1206, a camera component 1207, a positioning component 1208, and a power supply 1209.

A person skilled in the art may understand that the structure shown in FIG. 12 does not constitute a limitation to the terminal 1200, and the terminal may include more or fewer components than those shown in the figure, or some components may be combined, or a different component deployment may be used.

Figure 13:
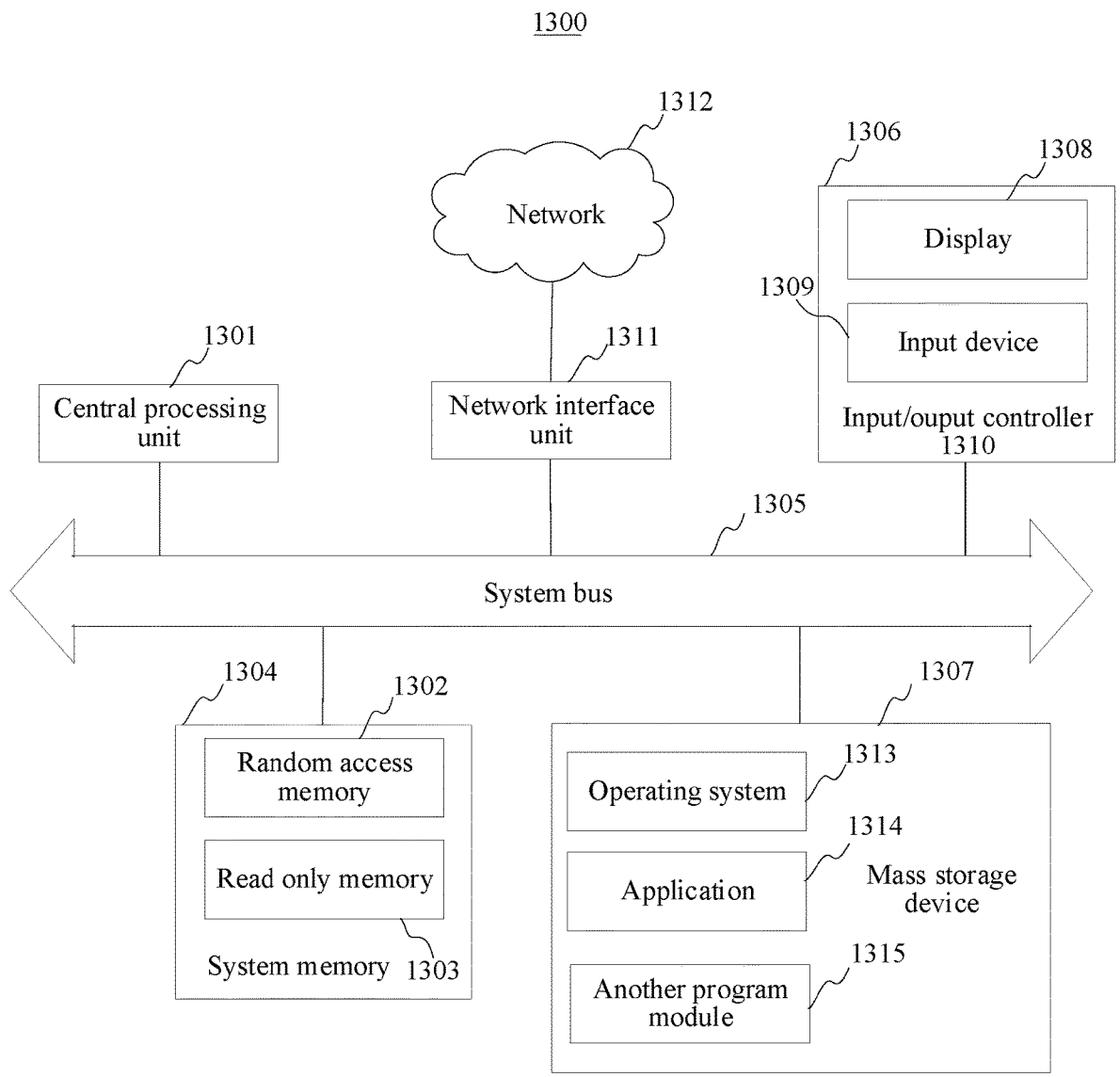
FIG. 13 is a schematic structural diagram of a server according to an exemplary embodiment of this disclosure.

FIG. 13 is a schematic structural diagram of a server according to an embodiment of this disclosure. Specifically:

a server 1300 includes a central processing unit (CPU) 1301, a system memory 1304 including a random access memory (RAM) 1302 and a read only memory (ROM) 1303, and a system bus 1305 connecting the system memory 1304 and the central processing unit 1301. The server 1300 further includes a basic input/output system (I/O) system 1306 for facilitating information transmission between various devices in a computer and a mass storage device 1307 configured to store an operating system 1313, an application 1314, and another program module 1315.

The basic I/O system 1306 includes a display 1308 configured to display information and an input device 1309 such as a mouse or a keyboard that is used for inputting information by a user. The display 1308 and the input device 1309 are connected to an I/O controller 1310 of the system bus 1305, to be connected to the CPU 1301. The basic I/O system 1306 may further include the input/output controller 1310, to receive and process inputs from a plurality of other devices, such as the keyboard, the mouse, or an electronic stylus. Similarly, the input/output controller 1310 further provides an output to a display, a printer or another type of output device.

The mass storage device 1307 is connected to the CPU 1301 by using a mass storage controller (not shown) connected to the system bus 1305. The large-capacity storage device 1307 and an associated computer-readable medium provide non-volatile storage for the server 1300. That is, the mass storage device 1307 may include a computer-readable medium (not shown) such as a hard disk or a compact disc ROM (CD-ROM) drive.

In general, the computer-readable medium may include a computer storage medium and a communication medium. The computer-storage medium includes volatile and non-volatile media, and removable and non-removable media implemented by using any method or technology used for storing information such as computer-readable instructions, data structures, program modules, or other data. The computer storage medium includes a RAM, a ROM, an EPROM, an EEPROM, a flash memory, or another solid state storage technology, a CD-ROM, a DVD, or another optical storage, a magnetic cassette, a magnetic tape, a magnetic disk storage, or another magnetic storage device. Certainly, those skilled in the art may learn that the computer storage medium is not limited to the above. The system memory 1304 and the mass storage device 1307 may be collectively referred to as a memory.

According to the embodiments of this disclosure, the server 1300 may further be connected, by using a network such as the Internet, to a remote computer on the network and run. That is, the server 1300 may be connected to a network 1312 by using a network interface unit 1311 connected to the system bus 1305, or may be connected to another type of network or a remote computer system (not shown) by using the network interface unit 1311.

The memory further includes at least one instruction, at least one program, a code set, or an instruction set. The at least one instruction, the at least one program, the code set, or the instruction set is stored in the memory and is configured to be executed by one or more processors to implement the foregoing video playing method.

In an exemplary embodiment, a computer device is further provided. The computer device may be a terminal or a server. The computer device includes a processor and a memory. The memory stores at least one instruction, at least one program, and a code set or an instruction set. The at least one instruction, the at least one program, and the code set or the instruction set are loaded and executed by the processor to implement the foregoing video playing method.

In an exemplary embodiment, a computer-readable storage medium is further provided, the computer-readable storage medium stores at least one instruction, at least one program, a code set, or an instruction set, and the at least one instruction, the at least one program, the code set, or the instruction set, when executed by a processor, implementing the foregoing video playing method.

In an exemplary embodiment, a computer-readable storage medium is further provided. The computer-readable storage medium stores a computer program, the computer program, when executed by a processor, implementing the foregoing video playing method.

In an exemplary embodiment, a computer program product is further provided. The computer program product includes computer instructions, and the computer instructions are stored in a computer-readable storage medium. A processor of a computer device reads the computer instructions from the computer-readable storage medium and executes the computer instructions to cause the computer device to implement the video playing method according to the foregoing aspects.

What is claimed is:

1. A video playing method, performed by a terminal, comprising:
   transmitting a scenario obtaining request, the scenario obtaining request being for requesting to obtain scenario information of a first scenario video, the scenario information of the first scenario video comprising a video address of the first scenario video and n scenario development options corresponding to the first scenario video, and n being a positive integer;
   playing the first scenario video according to the video address of the first scenario video;
   obtaining only a portion of scenario video content data respectively corresponding to the n scenario development options during playing the first scenario video and before receiving a selection instruction for any of the n scenario development options;
   adding the obtained portion of the scenario video content data respectively corresponding to the n scenario development options into a buffer list; and
   obtaining buffered scenario video content data of a second scenario video from the buffer list and playing the second scenario video in response to receiving a selection instruction for a target scenario development option in the n scenario development options,
   the second scenario video being a scenario video corresponding to the target scenario development option,
   the second scenario video being a scenario development of the first scenario video and comprising m scenario clips, and m being a positive integer,
   the buffered scenario video content data of the second scenario video being scenario video content data of a first scenario clip of the second scenario video, and none of the buffered scenario video content data being discarded before receiving the selection instruction for any of the n scenario development options.

2. The method of claim 1, wherein the scenario information of the first scenario video further comprises a video index file corresponding to at least one scenario development option, and the obtaining scenario video content data respectively corresponding to the n scenario development options comprises:
   parsing video index files respectively corresponding to the n scenario development options, to obtain video addresses respectively corresponding to the n scenario development options;
   adding the video addresses respectively corresponding to the n scenario development options into a to-be-buffered queue, wherein the to-be-buffered queue is for recording video addresses of to-be-buffered scenario videos; and
   obtaining the scenario video content data respectively corresponding to the n scenario development options according to the video addresses respectively corresponding to the n scenario development options.

3. The method of claim 2, wherein the obtaining the scenario video content data respectively corresponding to the n scenario development options further comprises:
   in response to the video addresses of the to-be-buffered scenario videos existing in the to-be-buffered queue, invoking a first sub-thread of a video reading thread to obtain the scenario video content data respectively corresponding to the n scenario development options according to the video addresses respectively corresponding to the n scenario development options.

4. The method of claim 3, further comprising:
   invoking a buffer thread to query whether the video addresses of the to-be-buffered scenario videos exist in the to-be-buffered queue in a manner of polling or hash indexing.

5. The method of claim 1, wherein, and the obtaining scenario video content data of a second scenario video from the buffer list and playing the second scenario video comprises:
   obtaining scenario video content data of a first scenario clip of the second scenario video from the buffer list;
   playing the first scenario clip according to the scenario video content data of the first scenario clip;
   sequentially obtaining scenario video content data of (m−1) scenario clips following the first scenario clip during playing the first scenario clip; and
   playing the (m−1) scenario clips in sequences of the (m−1) scenario clips in the second scenario video according to the scenarie video datascenario video content data of the (m−1) scenario clips.

6. The method of claim 5, wherein each of the scenario clips in the second scenario video has a playing timestamp, and the method further comprises:
   determining a playback sequence of the scenario clips in the second scenario video according to the playing stamp.

7. The method of claim 1, further comprising:
   deleting the scenario video content data corresponding to scenario development options other than the target scenario development option from the buffer list in response to obtaining the selection instruction for the target scenario development option.

8. The method of claim 1, further comprising:
   invoking a second sub-thread of the video reading thread to obtain a video index file corresponding to the second scenario video in response to the scenario video content data of the second scenario video not existing in the buffer list; and
   obtaining the scenario video content data of the second scenario video according to the video index file corresponding to the second scenario video.

9. The method of claim 1, wherein the playing the first scenario video according to the video address of the first scenario video comprises:
   invoking a second sub-thread of the video reading thread to play the first scenario video according to the video address of the first scenario video.

10. A video playing method, performed by a terminal, comprising:
    playing a first scenario video in a user interface of a game application;
    obtaining only a portion of scenario video content data respectively for n scenario development options corresponding to the first scenario video during playing the first scenario video and before receiving a selection instruction for any of the n scenario development options;
    adding the obtained portion of the scenario video content data to the buffer list;
    displaying the n scenario development options corresponding to the first scenario video in response to playing of the first scenario video being completed, n being a positive integer; and playing a second scenario video in the user interface in response to receiving a selection instruction for a target scenario development option in the n scenario development options, the second scenario video being a scenario video corresponding to the target scenario development option, and the second scenario video being obtained according to scenario video content data of the second scenario video buffered in the buffer list, the second scenario video being a scenario development of the first scenario video and comprising m scenario clips, and m being a positive integer, the buffered scenario video content data of the second scenario video being scenario video content data of a first scenario clip of the second scenario video, and none of the buffered scenario video content data being discarded before receiving a selection instruction for any of the n scenario development options.

11. The method of claim 10, further comprising:

displaying loading progress information during playing the first scenario video, wherein the loading progress information indicates a loading progress of the second scenario video; and canceling the display of the loading progress information in response to loading of the second scenario video being completed.

12. A video playing apparatus, comprising:

a memory operable to store computer-readable instructions; and a processor circuitry operable to read the computer-readable instructions, the processor circuitry when executing the computer-readable instructions is configured to:

transmit a scenario obtaining request, the scenario obtaining request being for requesting to obtain scenario information of a first scenario video, the scenario information of the first scenario video comprising a video address of the first scenario video and n scenario development options corresponding to the first scenario video, and n being a positive integer;

play the first scenario video according to the video address of the first scenario video;

obtain only a portion of scenario video content data respectively corresponding to the n scenario development options during playing the first scenario video and before receiving a selection instruction for any of the n scenario development options;

add the obtained portion of the scenario video content data respectively corresponding to the n scenario development options into a buffer list; and obtain buffered scenario video content data of a second scenario video from the buffer list and play the second scenario video in response to receiving a selection instruction for a target scenario development option in the n scenario development options, the second scenario video being a scenario video corresponding to the target scenario development option, the second scenario video being a scenario development of the first scenario video and comprising m scenario clips, and m being a positive integer, the buffered scenario video content data of the second scenario video being scenario video content data of a first scenario clip of the second scenario video, and none of the the buffered scenario video content data being discarded before receiving the selection instruction for any of the n scenario development options.

13. The apparatus of claim 12, wherein the scenario information of the first scenario video further comprises a video index file corresponding to at least one scenario development option, and the processor circuitry is configured to:

parse video index files respectively corresponding to the n scenario development options, to obtain video addresses respectively corresponding to the n scenario development options;

add the video addresses respectively corresponding to the n scenario development options into a to-be-buffered queue, wherein the to-be-buffered queue is for recording video addresses of to-be-buffered scenario videos; and obtain the scenario video content data respectively corresponding to the n scenario development options according to the video addresses respectively corresponding to the n scenario development options.

14. The apparatus of claim 13, wherein the processor circuitry is configured to:

in response to the video addresses of the to-be-buffered scenario videos existing in the to-be-buffered queue, invoke a first sub-thread of a video reading thread to obtain the scenario video content data respectively corresponding to the n scenario development options according to the video addresses respectively corresponding to the n scenario development options.

15. The apparatus of claim 14, the processor circuitry is further configured to:

invoke a buffer thread to query whether the video addresses of the to-be-buffered scenario videos exist in the to-be-buffered queue in a manner of polling or hash indexing.

16. The apparatus of claim 12, the processor circuitry is configured to:

play the first scenario clip according to the scenario video content data of the first scenario clip;

sequentially obtain scenario video content data of (m−1) scenario clips following the first scenario clip during playing the first scenario clip; and play the (m−1) scenario clips in sequences of the (m−1) scenario clips in the second scenario video according to the scenario video content data of the (m−1) scenario clips.

17. The apparatus of claim 16, wherein each of the scenario clips in the second scenario video has a playing timestamp, and the processor circuitry is further configured to:

determine a playback sequence of the scenario clips in the second scenario video according to the playing stamp.

18. The apparatus of claim 12, wherein the processor circuitry is further configured to:

delete the scenario video content data corresponding to scenario development options other than the target scenario development option from the buffer list in response to obtaining the selection instruction for the target scenario development option.

19. The apparatus of claim 12, the processor circuitry is further configured to:

invoke a second sub-thread of the video reading thread to obtain a video index file corresponding to the second scenario video in response to the scenario video content data of the second scenario video not existing in the buffer list; and obtain the scenario video content data of the second scenario video according to the video index file corresponding to the second scenario video.

20. The apparatus of claim 12, wherein the processor circuitry is configured to:
    invoke a second sub-thread of the video reading thread to play the first scenario video according to the video address of the first scenario video.

\* \* \* \* \*